(12) United States Patent
Enomoto

(10) Patent No.: US 7,502,554 B2
(45) Date of Patent: Mar. 10, 2009

(54) ANTI-SHAKE SYSTEM

(75) Inventor: Shigeo Enomoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 358 days.

(21) Appl. No.: 11/530,626

(22) Filed: Sep. 11, 2006

(65) Prior Publication Data

US 2007/0058958 A1    Mar. 15, 2007

(30) Foreign Application Priority Data

Sep. 15, 2005    (JP)    ............................ 2005-269041

(51) Int. Cl.
 *G03B 17/00* (2006.01)
 *H04N 5/228* (2006.01)

(52) U.S. Cl. .................. 396/55; 348/208.2; 348/208.7; 348/208.11

(58) Field of Classification Search ............ 396/52–55; 348/E5.046, 208.99–208.8, 208.11–208.12; 359/554–557

See application file for complete search history.

(56) References Cited

U.S. PATENT DOCUMENTS

| | | | | |
|---|---|---|---|---|
| 3,838,927 | A * | 10/1974 | Iwafune et al. | ............... 356/250 |
| 6,374,049 | B1 * | 4/2002 | Fujinaga | ..................... 396/55 |
| 7,432,953 | B2 * | 10/2008 | Washisu | .................. 348/208.5 |
| 2005/0057662 | A1 * | 3/2005 | Washisu | ................. 348/208.99 |
| 2006/0017818 | A1 * | 1/2006 | Enomoto | .................. 348/219.1 |
| 2006/0018646 | A1 * | 1/2006 | Stavely | ......................... 396/55 |
| 2007/0014555 | A1 * | 1/2007 | Hirunuma et al. | ............. 396/55 |
| 2007/0146883 | A1 * | 6/2007 | Akada et al. | ................ 359/554 |

FOREIGN PATENT DOCUMENTS

| | | |
|---|---|---|
| JP | 7-098470 | 4/1995 |
| JP | 8-184870 | 7/1996 |
| JP | 9-080549 | 3/1997 |
| JP | 9-230408 | 9/1997 |
| JP | 11-109435 | 4/1999 |
| JP | 2002-139759 | 5/2002 |
| JP | 2003-344889 | 12/2003 |

OTHER PUBLICATIONS

English language Abstract of JP 7-098470.
English language Abstract of JP2003-344889.
English language Abstract of JP 2002-139759.
English language Abstract of JP 11-109435.
English language Abstract of JP 9-230408.
English language Abstract of JP 9-080549.
English language Abstract of JP 8-184870.
U.S. Appl. No. 11/423,593 to SEO et al., which was filed on Jun. 12, 2006.
U.S. Appl. No. 11/457,585 to Hirunuma et al., which was filed on Jul. 14, 2006.

* cited by examiner

*Primary Examiner*—W. B. Perkey
*Assistant Examiner*—Bret Adams
(74) *Attorney, Agent, or Firm*—Greenblum & Bernstein, P.L.C.

(57) ABSTRACT

An anti-shake system includes a movable portion to which an optical element is mounted; a support member which holds the movable portion in a manner to allow the movable portion to move freely in directions orthogonal to an optical axis; and a drive system which drives the movable portion in the directions orthogonal to the optical axis. A natural frequency of the movable portion that originates from the movable portion and the support member is set within the range of frequencies of shaking of an apparatus equipped with the anti-shake system which is caused by hand shake.

13 Claims, 13 Drawing Sheets

Fig. 1
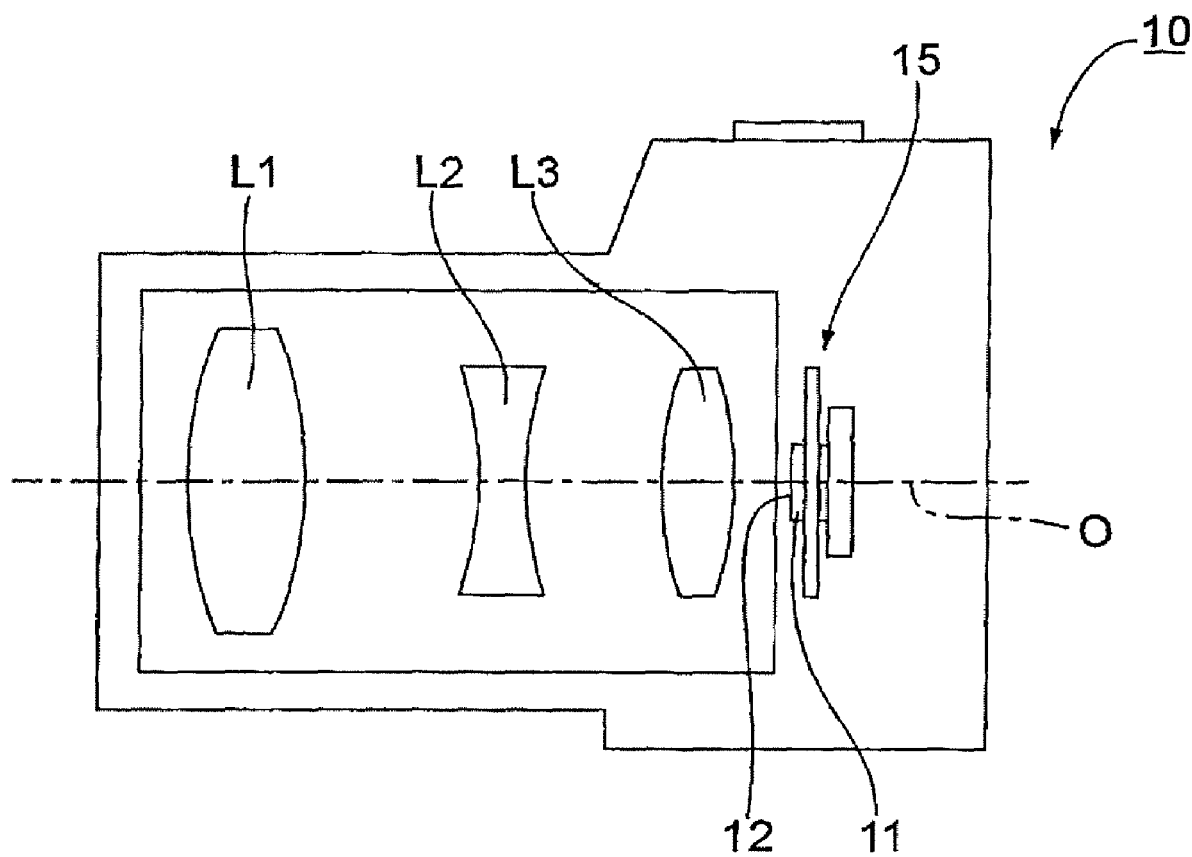
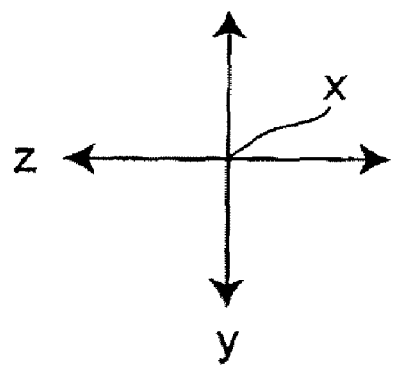

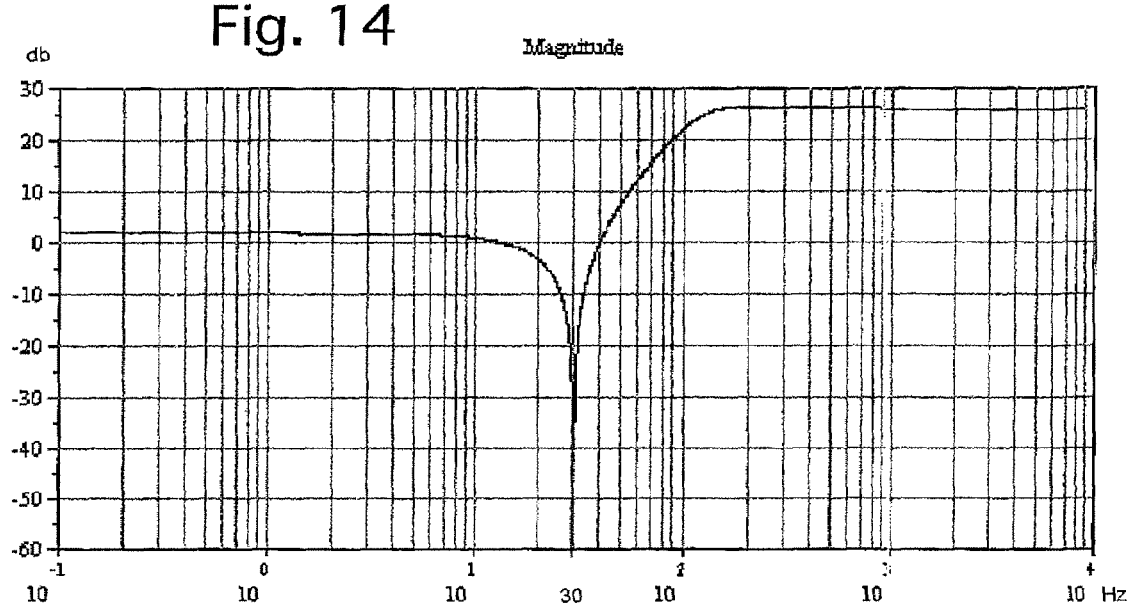
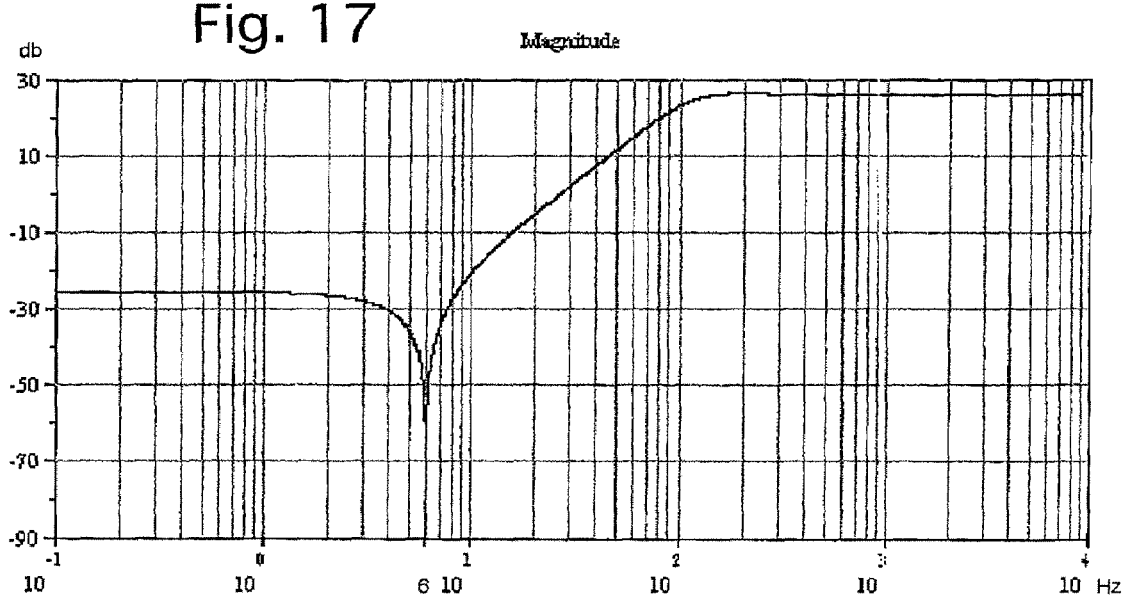

ANTI-SHAKE SYSTEM

BACKGROUND OF THE INVENTION

1. Field of the Invention

The present invention relates to an anti-shake system which moves a movable member holding a correction lens or an image pickup device in directions orthogonal to an optical axis to counteract the effects of shaking of an apparatus (e.g., camera) equipped with the anti-shake system which is caused by hand shake.

2. Description of the Prior Art

Various types of digital cameras including an anti-shake system have been developed in recent years. An anti-shake system moves a correction optical system (e.g., a correction lens), which is positioned at some midpoint in a photographing optical system, or an image pickup device in a plane orthogonal to an optical axis of the photographing optical system to offset image shake caused by hand shake. The correction optical system or the image pickup device has its own natural frequency (natural vibration frequency) at which the correction optical system or the image pickup device resonates with vibrations of an apparatus equipped with the anti-shake system. Accordingly, anti-shake systems which set the natural frequency within a range of frequencies above the frequency of camera shake (caused by hand shake) have been developed to prevent the natural frequency from resonating with the frequency of camera shake in the case where the correction optical system or the image pickup device is driven under a closed-loop control and an open-loop control. Such inventions are disclosed in the following publications: Japanese unexamined patent publications H07-098470, 2003-344889, 2002-139759, H11-109435, H09-230408, H09-080549 and H08-184870.

However, in the anti-shake systems proposed in these patent publications, in order to set the natural frequency within a range of frequencies above the frequency of camera shake, the driving force required for driving the correction optical system or the image pickup device becomes great, to thereby increase the power consumption of the anti-shake system because it is necessary to increase the spring rate of a spring member (or spring members) which holds the correction optical system or the image pickup device.

SUMMARY OF THE INVENTION

The present invention provides an anti-shake system which consumes lower amounts of power with no need to increase either the spring rate of a spring member that supports a movable portion of the anti-shake system or the natural frequency of the movable portion.

According to an aspect of the present invention, an anti-shake system is provided, including a movable portion to which an optical element is mounted; a support member which holds the movable portion in a manner to allow the movable portion to move freely in directions orthogonal to an optical axis; and a drive system which drives the movable portion in the directions orthogonal to the optical axis. A natural frequency of the movable portion that originates from the movable portion and the support member is set within the range of frequencies of shaking of an apparatus equipped with the anti-shake system which is caused by hand shake.

It is desirable for the anti-shake system to include a closed-loop control system for driving the drive system based on a shake detection signal.

It is desirable for the support member to include at least one resilient member which holds the movable portion in the manner to allow the movable portion to move freely in the directions orthogonal to the optical axis. The drive system drives the movable portion in a direction of resilient stress of the resilient member.

It is desirable for the support member to include at least one resilient member which holds the movable portion at an initial position while allowing the movable portion to move freely in the directions orthogonal to the optical axis, for the optical element to be an image pickup device; for at least one of an elastically deformable signal line and an elastically deformable electric supply line to be connected to the image pickup device from outside of the movable portion; and for the natural frequency of the movable portion to originate from the movable portion, the support member and the one of the elastically deformable signal line and the elastically deformable electric supply line.

It is desirable for the natural frequency of the movable portion to be set by adjusting a spring constant of the resilient member.

It is desirable for the natural frequency of the movable portion to be set to below 15 Hz.

It is desirable for the natural frequency of the movable portion to be set within a range of frequencies from 3 to 9 Hz.

It is desirable for the support member to include a pair of the X-axis direction leaf springs and a pair of the Y-axis direction leaf springs which extend in a specific X-axis direction and a Y-axis direction orthogonal to the X-axis direction in a free state, respectively.

It is desirable for the drive system to include an X-axis direction planar drive coil and a Y-axis direction planar drive coil which are mounted to a coil substrate to be respectively positioned in magnetic fields of two stationary magnets.

The apparatus that is equipped with the anti-shake system can be a camera.

It is desirable for the optical element to be mounted on the coil substrate, and for the optical element to include one of a correction optical system and an image pickup device.

In an embodiment, an anti-shake system of a camera is provided, including a movable portion which supports an optical element of a photographing optical system of the camera, the movable portion being supported to be freely movable in directions orthogonal to an optical axis of the photographing optical system; and a drive system which drives the movable portion in the directions orthogonal to the optical axis to counteract effects of camera shake that is caused by hand shake. A natural frequency of the movable portion is set within a range of frequencies of the camera shake.

It is desirable for the optical element to include one of an image pickup device and a lens element.

According to the present invention, the natural frequency of the movable portion is set within a range of frequencies of camera shake, which results in a reduction in power consumption of the anti-shake system.

Furthermore, since the spring rate of the resilient member that holds the movable portion can be made small, the amount of driving force for driving the movable portion can be reduced, resulting in less consumption of electrical power, so that if a battery is used for the power source, the battery can be used for a longer period of time before needing replacing.

The present disclosure relates to subject matter contained in Japanese Patent Application No. 2005-269041 (filed on Sep. 15, 2005) which is expressly incorporated herein in its entirety.

BRIEF DESCRIPTION OF THE DRAWINGS

The present invention will be discussed below in detail with reference to the accompanying drawings, in which:

FIG. 1 is a longitudinal sectional view of an SLR digital camera which incorporates an embodiment of a camera shake correction apparatus (anti-shake system), according to the present invention;

FIG. 14 is a Bode plot of the amplitude characteristic of a transfer function $G_c$ in the camera shake correction apparatus in the case where the natural frequency is set in the vicinity of 30 Hz;

FIG. 17 is a Bode plot of the amplitude characteristic of the transfer function $G_c$ in the camera shake correction apparatus in the case where the natural frequency is set in the vicinity of 6 Hz;

DESCRIPTION OF THE PREFERRED EMBODIMENT

Figure 2:
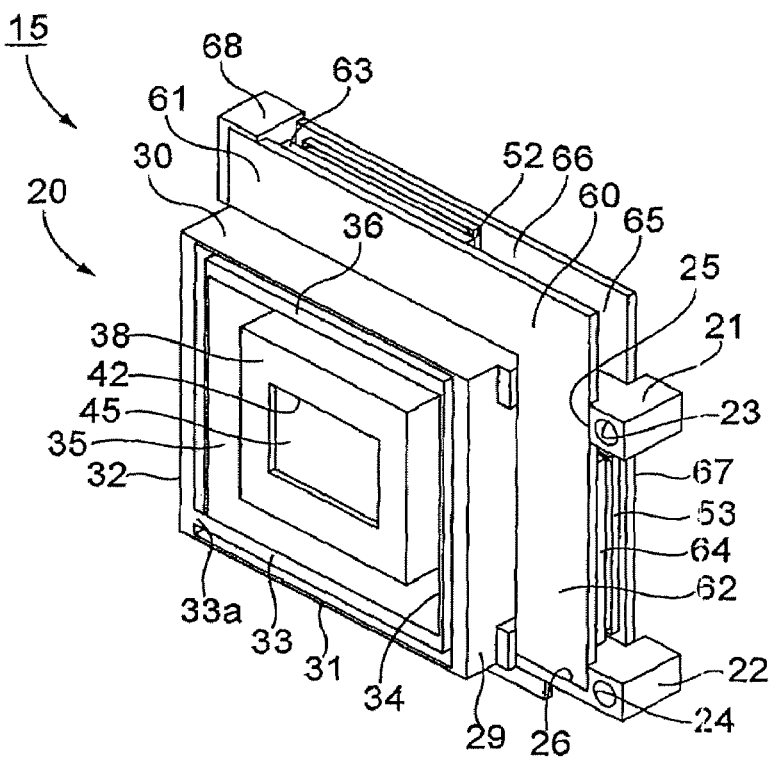
FIG. 2 is a perspective view of the camera shake correction apparatus.

An embodiment of a camera shake correction apparatus (anti-shake system/image stabilizer) according to the present invention will be hereinafter discussed with reference to FIGS. 1 through 7. The camera shake correction apparatus 15 is incorporated in a digital camera 10 (stationary body) as shown in FIG. 1.

As shown in FIG. 1, the digital camera 10 is provided therein with a photographing optical system including a plurality of lenses L1, L2 and L3. An image pickup device 11 is provided behind the lens L3. The image pickup device 11 is provided with an imaging surface (image-forming plane) 12 which is perpendicular to an optical axis O of the photographing optical system. The position of the imaging surface 12 in the direction of the optical axis O (optical axis direction) is located on an image plane of the photographing optical system. In the present embodiment, the image pickup device 11 is secured to the camera shake correction apparatus 15 that is incorporated in the digital camera 10. A solid-state image pickup device such as a CCD or CMOS image sensor is generally adopted as the image pickup device 11.

The camera shake correction apparatus 15 is provided with a stage apparatus (movable stage) 20 which supports the image pickup device 11 in a manner to allow the image pickup device 11 to move in directions orthogonal to the optical axis O relative to a camera body (stationary body).

The stage apparatus 20 is fixed to the camera body to be positioned immediately behind the lens L3. The stage apparatus 20 is made of synthetic resin such as ABS resin or polycarbonate resin, and is provided with a pair of spacers (upper and lower spacers) 21 and 22 which extend along an X-axis direction (horizontal direction of the digital camera 10; the arrow X in FIG. 3). The stage apparatus 20 is fixed to the camera body by two set screws (not shown) which extend through upper and lower fixing holes 23 and 24 drilled in ends of the pair of spacers 21 and 22, respectively. The pair of spacers 21 and 22 are provided on front surfaces thereof with a pair of front mounting recesses 25 and 26, respectively, and are further provided on rear surfaces of the pair of spacers 21 and 22 with a pair of rear mounting recesses 27 and 28, the shapes of which correspond to the pair of front mounting recesses 25 and 26, respectively (see FIG. 5).

Herein throughout the specification, in the case where the camera shake correction apparatus 15 is provided in the digital camera 10, the Z-axis refers to the optical axis O of a photographing lens when mounted onto the digital camera 10, the X-axis (X-axis direction) refers to the horizontal direction orthogonal to the Z-axis direction when the camera is positioned at a normal position (i.e., not inclined), and the Y-axis (Y-axis direction) refers to a vertical direction extending orthogonally both to the Z-axis and X-axis.

The stage apparatus 20 is provided with a stationary support side-member (stationary support member/stationary support plate) 29 which is elongated in a Y-axis direction (vertical direction of the digital camera 10; the arrow Y in FIG. 3; vertical direction as viewed in FIG. 3), and the pair of spacers 21 and 22 are connected to each other by the stationary support side-member 29. The stage apparatus 20 is provided with a pair of x-axis direction leaf springs (upper and lower resilient leaves) 30 and 31 which are elongated leftward as viewed in FIG. 3 along the X-axis direction from upper and lower ends of the stationary support side-member 29. The stage apparatus 20 is provided with a movable support side-member (movable support member/movable support plate) 32 which is elongated in the Y-axis direction, and left ends (as viewed in FIG. 3) of the pair of X-axis direction leaf springs 30 and 31 are connected to each other by the movable support side-member 32. The thickness of each X-axis direction leaf spring 30 and 31 in the Y-axis direction is smaller than the thickness of each of the stationary support side-member 29 and the movable support side-member 32 in the x-axis direction, and the stationary support side-member 29 and the movable support side-member 32 are not resiliently deformable, whereas each of the pair of X-axis direction leaf springs 30 and 31 is resiliently deformable in the Y-axis direction. The stationary support side-member 29, the pair of X-axis direction leaf springs 30 and 31 and the movable support side-member 32 constitute a Y-axis direction deformable body.

Figure 3:
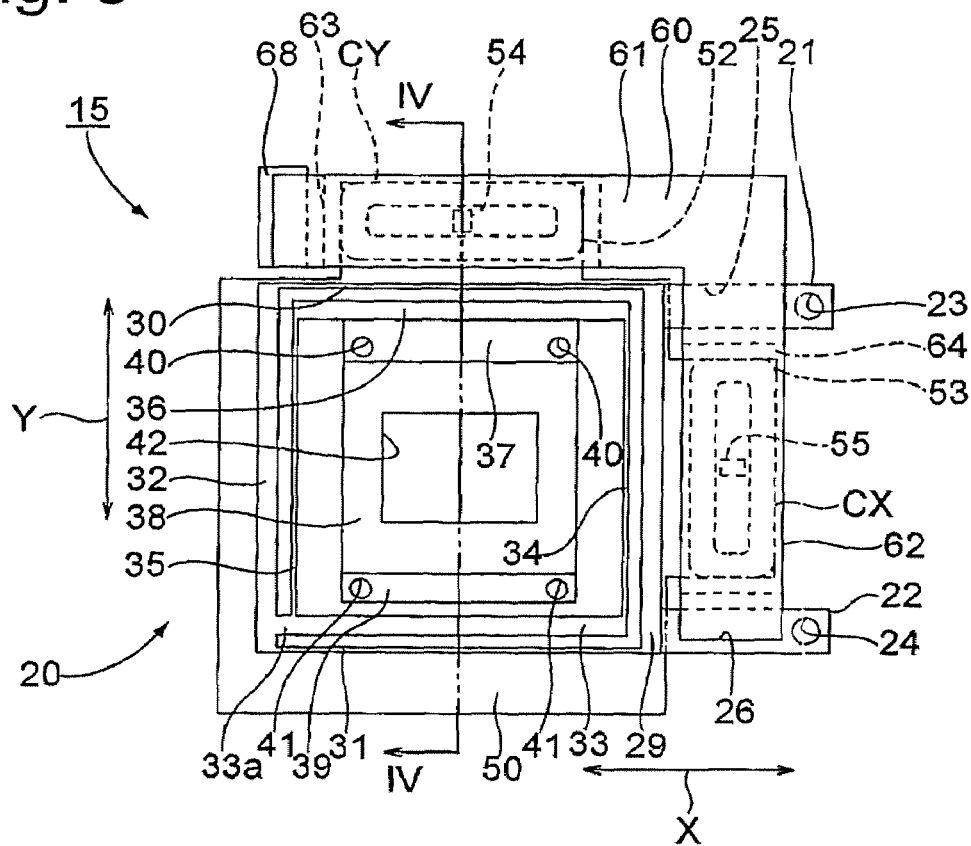
FIG. 3 is a front elevational view of the camera shake correction apparatus.
Figure 4:
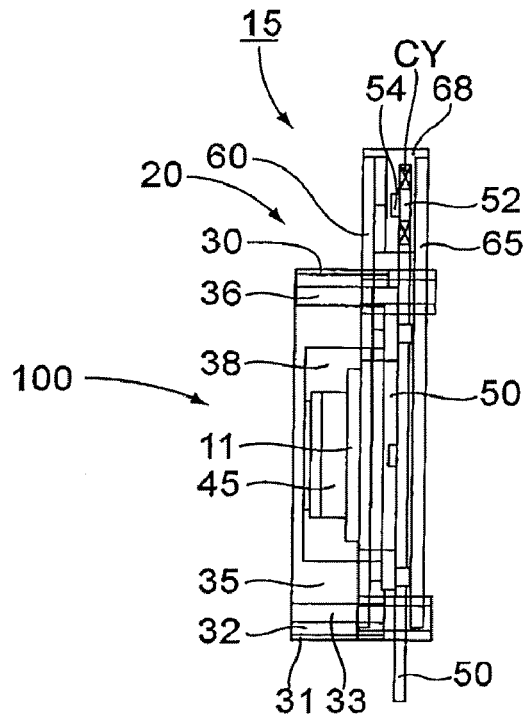
FIG. 4 is a cross sectional view taken along IV-IV line shown in FIG. 3.
Figure 5:
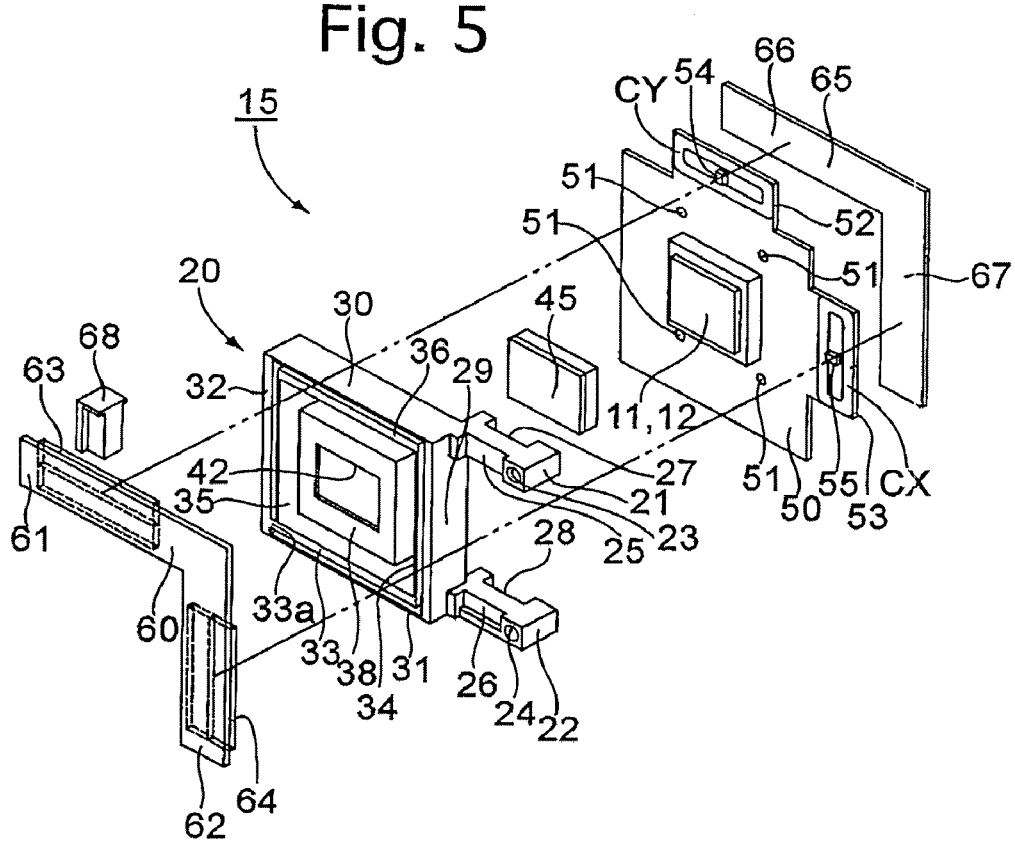
FIG. 5 is an exploded perspective view of the camera shake correction apparatus.
Figure 6:
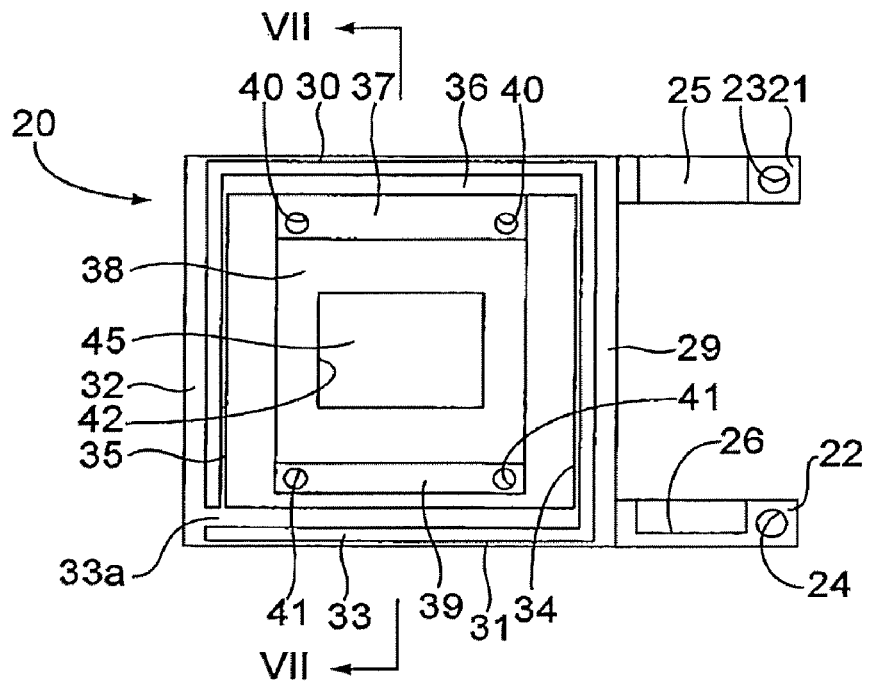
FIG. 6 is a front elevational view of a stage apparatus incorporated in the camera shake correction apparatus.
Figure 7:
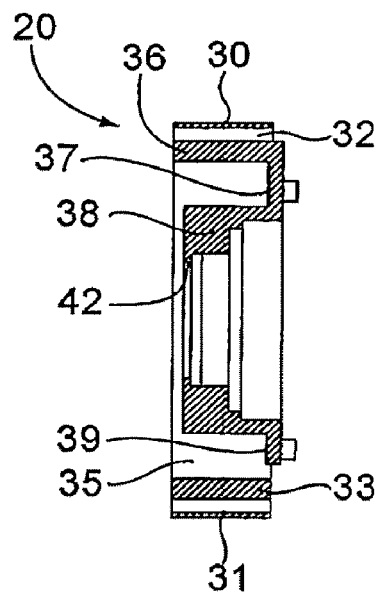
FIG. 7 is a cross sectional view taken along VII-VII line shown in FIG. 6.

The stage apparatus 20 is provided inside the Y-axis direction deformable body with a support member (horizontal support plate) 33 which is elongated rightward as viewed in FIG. 3 along the X-axis direction from an inner side surface of the movable support side-member 32 in the vicinity of the lower end thereof. Accordingly, the support member 33 is formed like a cantilever which extends from the movable support side-member 32. The fixed end (left end as viewed in FIG. 3) of the support member 33 serves as a joint portion (support member joint portion) 33 a which joins the support member 33 to the movable support side-member 32 , and a pair of Y-axis direction leaf springs (right and left resilient leaves) 34 and 35 are elongated upward in the Y-axis direction from opposite ends of an upper surface of the support member 33 excluding the joint portion 33a, respectively. Upper ends of the pair of Y-axis direction leaf springs 34 and 35 are connected to each other by a connecting member (horizontal connecting plate) 36 which is elongated in the X-axis direction. The thickness of each Y-axis direction leaf spring 34 and 35 in the X-axis direction is smaller than the thickness of each of the support member 33 and the connecting member 36 in the Y-axis direction. The support member 33 and the connecting member 36 are not resiliently deformable, whereas each of the pair of Y-axis direction leaf springs 34 and 35 is resiliently deformable in the X-axis direction. The support member 33 , the pair of Y-axis direction leaf springs 34 and 35 end the connecting member 36 constitute an X-axis direction deformable body.

The X-axis direction deformable body is provided on an inner surface of the connecting member 36 with an upper mounting portion 37 which extends downward from the connecting member 36 in the Y-axis direction to be positioned inside of the X-axis direction deformable body between the pair of Y-axis direction leaf springs 34 and 35. The X-axis direction deformable body is further provided at a lower end of the upper mounting portion 37 with a support enclosure 38 which extends downward from the upper mounting portion 37 in the Y-axis direction. The support enclosure 38 has a substantially square shape as viewed from the front of the stage apparatus 20. A lower mounting portion 39 is fixed to the bottom end of the support enclosure 38. The back surfaces of the upper mounting portion 37 and the lower mounting portion 39 lie in a plane parallel to both the X-direction and the Y-direction, i.e., parallel to an X-Y axis plane. The upper mounting portion 37 is provided with two fixing holes (through holes) 40 , and the lower mounting portion 39 is provided with two fixing holes (through holes) 41. The support enclosure 38 is formed in the shape of a box, the rear end of which is fully open. The support enclosure 38 is provided, on a front wall thereof at the center of the front wall, with a rectangular aperture 42. The upper mounting portion 37, the support enclosure 38 and the lower mounting portion 39 are formed to be positioned away from each of the pair of Y-axis direction leaf springs 34 and 35 by a predetermined distance so as not to come in contact therewith, and the lower mounting portion 39 is formed to be positioned away from the support member 33 by a predetermined distance so as not to come in contact therewith.

The X-axis direction deformable body, the Y-axis direction deformable body, the mounting portion 37, the support enclosure 38 and the lower mounting portion 39 constitute a movable portion 100 of the stage apparatus 20, wherein the mounting portion 37, the support enclosure 38 and the lower mounting portion 39 are supported by the X-axis direction deformable body and the Y-axis direction deformable body to be freely movable in the X-Y axis directions that are orthogonal to the Z-axis direction. The entire stage apparatus 20 can be molded as one body by injection molding using a molding die (not shown).

The camera shake correction apparatus 15 is provided in the support enclosure 38 with an optical low-pass filter 45 having a rectangular shape as viewed from the front of the camera shake correction apparatus 15. The optical low-pass filter 45 is fitted into the support enclosure 38 to close the rectangular aperture 42 from the back thereof. The image pickup device 11 is also fitted into the support enclosure 38. The camera shake correction apparatus 15 is provided immediately behind the support enclosure 38 with a coil substrate 50 which is positioned parallel to the X-Y axis plane, a front surface of which is fixed to the support enclosure 38 (see FIGS. 4 and 5). The image pickup device 11 is fixed to a central portion of the front surface of the coil substrate 50. The coil substrate 50 and the stage apparatus 20 are fixed to each other as one integral body by four set screws (not shown) which are screwed into four female screw holes 51 on the coil substrate 50 through the four fixing holes 40 and 41 of the stage apparatus 20, respectively. Namely, the optical low-pass filter 45, the image pickup device 11 and the coil substrate 50 are supported by the stage apparatus 20 to be movable in the X-Y axis directions.

Although not shown in the drawings, electric supply lines and signal lines which are respectively connected to a power supply and a control board of the digital camera 10 are connected to the coil substrate 50. The electric supply lines and the signal lines are provided as, e.g., flexible printed wiring board or vinyl-coated wires to allow the coil substrate 50 to move in the X-Y axis directions.

An upper projection 52 and a right projection 53 project from an upper end and a right end of the coil substrate 50, respectively. An X-axis direction Hall element (X-axis direction position sensor) 54 is fixed to a front surface of the upper projection 52, while a Y-axis direction Hall element (Y-axis direction position sensor) 55 is fixed to a front surface of the right projection 53. An X-axis direction planar drive coil CX is fixed to a front surface of the upper projection 52 to surround the Y-axis direction Hall element 55. The X-axis direction planar drive coil CX is, e.g., printed as a printed coil pattern on a front surface of the upper projection 52. Likewise, a Y-axis direction planar drive coil CY is fixed to a front surface of the right projection 53 to surround the X-axis direction Hall element 54. The Y-axis direction planar drive coil CY is, e.g., printed as a printed coil pattern on a front surface of the right projection 53. The X-axis direction planar drive coil CX and the Y-axis direction planar drive coil CY have more than one-hundred turns, and lie in a plane parallel to both the X-axis direction and the Y-axis direction, i.e., parallel to an X-Y axis plane.

The camera shake correction apparatus 15 is provided with two yoke members: a planar L-shaped front yoke 60 and a planar L-shaped rear yoke 65 positioned behind the front yoke 60. These two yoke members are made of ferromagnetic substance such as iron, have the same shape and size, and are parallel to an X-Y axis plane. The camera shake correction apparatus 15 is provided, on a rear surface of an X-axis direction plate portion 61 of the front yoke 60 that faces an X-axis direction plate portion 66 of the rear yoke 63, with a permanent magnet (first plate magnet) 63 which is fixed to the rear surface of the X-axis direction plate portion 61. The camera shake correction apparatus 15 is further provided, on a rear surface of a Y-axis direction plate portion 62 of the front yoke 60 that faces a Y-axis direction plate portion 67 of the rear yoke 65, with a permanent magnet (second plate magnet) 64 which is fixed to the rear surface of the Y-axis direction plate portion 62. The permanent magnet 63 includes an N-pole and an S-pole which are aligned in the Y-axis direction, and the permanent magnet 64 includes an N-pole and an S-pole which are aligned in the X-axis direction. The X-axis direction Hall element 54 is adopted to detect variations in magnetic flux in the vicinity of the border between the N-pole and the S-pole of the permanent magnet 63 to obtain information on the position of the coil substrate 50 in the X-axis direction, and the Y-axis direction Hall element 55 is adopted to detect variations in magnetic flux in the vicinity of the border between the N-pole and the S-pole of the permanent magnet 64 to obtain information on the position of the coil substrate 50 in the Y-axis direction.

The X-axis direction planar drive coil CX and the permanent magnet 64 are elongated in the Y-axis direction and the Y-axis direction planar drive coil CY and the permanent magnet 63 are elongated in the X-axis direction so that magnetic forces moving the coil substrate 50 parallel to itself in the X-Y axis directions act on the coil substrate 50.

The Y-axis direction plate portion 62 of the front yoke 60 is engaged in the pair of front mounting recesses 25 and 26 of the stage apparatus 20 to be fixed thereto, and the Y-axis direction plate portion 67 of the rear yoke 65 is fixedly engaged in the pair of rear mounting recesses 27 and 28 of the stage apparatus 20. As shown in FIGS. 2 and 3, the X-axis direction plate portion 61 of the front yoke 60 and the X-axis direction plate portion 66 of the rear yoke 65 are positioned above the upper X-axis direction leaf spring 30 of the stage apparatus 20 to be elongated in the X-axis direction and to face each other in the Z-axis direction with the top projection 52 of the coil substrate 50 being positioned between the X-axis direction plate portion 61 and the X-axis direction plate portion 66, and a Y-axis direction magnetic circuit is formed between the X-axis direction plate portion 66 and the combination of the X-axis direction plate portion 61 and the permanent magnet 63. Left ends of the X-axis direction plate portion 61 and the X-axis direction plate portion 66 are connected to each other by a connector piece 68 made of synthetic resin. The Y-axis direction plate portion 62 of the front yoke 60 and the Y-axis direction plate portion 67 of the rear yoke 65 are positioned to be elongated in the Y-axis direction and to face each other in the Z-axis direction, and an X-axis direction magnetic circuit is formed between the Y-axis direction plate portion 62 and a combination of the Y-axis direction plate portion 67 and the permanent magnet 64.

The front yoke 60, the permanent magnet 64, and the rear yoke 65 constitute an X-axis direction magnetic power generator, and the front yoke 60, the permanent magnet 63, and the rear yoke 65 constitute a Y-axis direction magnetic power generator. The X-axis direction magnetic power generator and the X-axis direction planar drive coil CX constitute an X-axis direction actuator, and the Y-axis direction magnetic power generator and the Y-axis direction planar drive coil CY constitute a Y-axis direction actuator. The X-axis direction actuator and the Y-axis direction actuator collectively constitute a drive system for driving the movable portion 100 in the X-axis and Y-axis directions. All the elements shown in FIGS. 2 through 7 which have been described above and the controller which will be discussed later constitute the camera shake correction apparatus 15.

Operations of the embodiment of the camera shake correction apparatus 15 will be hereinafter discussed with reference to the block diagram shown in FIG. 8.

The camera shake correction apparatus 15 performs a shake correction operation (image stabilizing operation) so as to offset image shake caused by deflections (angular deflections) of the optical axis O of the photographing optical system which are caused by hand shake of a photographer. Such deflections of the optical axis O are detected as two separate components: the X-axis direction component and the Y-axis direction component by an X-axis direction angular velocity sensor 201 and a Y-axis direction angular velocity sensor 202, respectively, which are incorporated in the digital camera 10.

Light transmitted through the lenses L1 through L3 is converged onto the imaging surface 12 of the image pickup device 11 through the optical low-pass filter 45 to form an image on the imaging surface 12. If a camera shake correction switch (not shown) of the digital camera 10 is ON during a photographing operation, outputs of the X-axis direction angular velocity sensor (shake detection sensor) 201 and the Y-axis direction angular velocity sensor (shake detection sensor) 202 are integrated by integrating circuits 203 and 204 to be converted into an X-axis direction deflection amount and a Y-axis direction deflection amount of the optical axis O (i.e., into the deflection amount of the digital camera 10 ), respectively. The output (deflection amount of the digital camera 10 ) of the integrating circuit 203 and the output (amount of movement of the image pickup device) of the X-axis direction Hall element 54 are compared with each other in an error amplifier (an element of the controller) 205, and subsequently the error amplifier 205 applies a voltage which corresponds to an output difference between the integrating circuit 203 and the X-axis direction Hall element 54 to the X-axis direction planar drive coil CX to drive the image pickup device 11 in a manner to reduce the output difference. Similarly, the output (deflection amount of the digital camera 10 ) of the integrating circuit 204 and the output (amount of movement of the image pickup device) of the Y-axis direction Hall element 55 are compared with each other in an error amplifier (an element of the controller) 206, and subsequently the error amplifier 206 applies a voltage which corresponds to an output difference between the integrating circuit 204 and the Y-axis direction Hall element 55 to the Y-axis direction planar drive coil CY to drive the image pickup device 11 in a manner to reduce the output difference. Namely, the image pickup device 11 is driven in the X-Y axis directions in response to deflections (deflection amount) of the optical axis O to reduce image shake on the image pickup device 11 (i.e., to stabilize an object image formed on the imaging surface 12) which is caused by hand shake.

The image pickup device 11 is driven in the X-Y axis directions in the following manner.

If the error amplifier 205 supplies an electric current only to the X-axis direction planar drive coil CX in a specific direction, a rightward linear force in the X-axis direction is produced in the X-axis direction planar drive coil CX due to the magnetic force produced by the X-axis direction magnetic circuit provided between the Y-axis direction plate portion 67 and a combination of the Y-axis direction plate portion 62 and the permanent magnet 64. Thereupon, each of the pair of Y-axis direction leaf springs 34 and 35 is resiliently deformed in the shape of a letter S as viewed in the Z-axis direction so that the connecting member 36 substantially linearly moves rightward in the X-axis direction relative to the support member 33 within a range of movement in which the connecting member 36 does not come in contact with either the stationary support side-member 29 or the movable support side-member 32, and accordingly, the coil substrate 50 and the image pickup device 11 substantially linearly move rightward. For reference purposes, FIG. 9 shows an operative state (resiliently deformed state) of the X-axis direction deformable body in which each of the pair of Y-axis direction leaf springs 34 and 35 is resiliently deformed in the shape of a letter S (the amount of deformation of each Y-axis direction leaf spring 34 and 35 is exaggerated in FIG. 9 for the purpose of illustration).

On the other hand, if the error amplifier 205 supplies an electric current only to the X-axis direction planar drive coil CX in the direction opposite to the aforementioned specific direction, a leftward linear force in the X-axis direction is produced in the X-axis direction planar drive coil CX due to the magnetic force produced by the X-axis direction magnetic circuit. Thereupon, each of the pair of Y-axis direction leaf springs 34 and 35 is resiliently deformed in the shape of a letter S as viewed in the Z-axis direction so that the connecting member 36 substantially linearly moves leftward in the X-axis direction relative to the support member 33 within a range of movement in which the connecting member 36 does not come in contact with either the stationary support side-member 29 or the movable support side-member 32, and accordingly, the coil substrate 50 and the image pickup device 11 substantially linearly move leftward.

Figure 9:
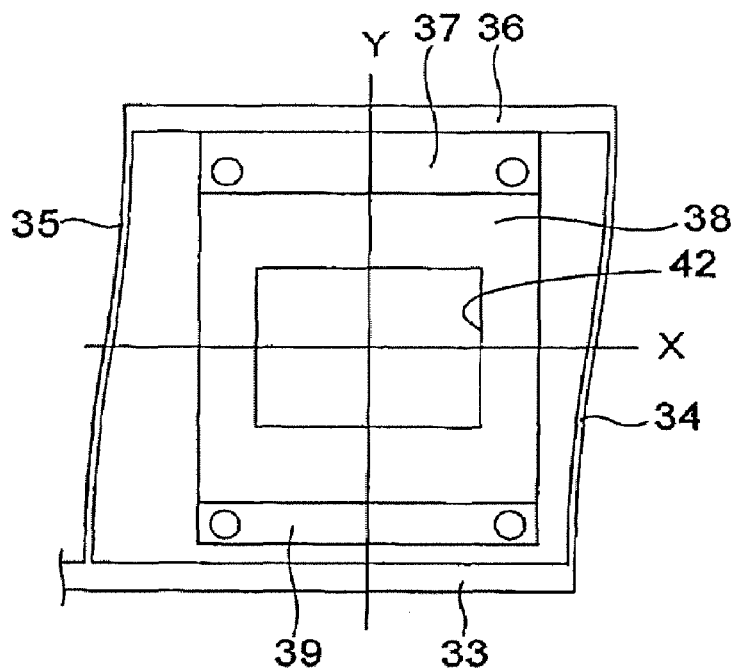
FIG. 9 is a front elevational view of an X-axis direction deformable body, showing an operative state (resiliently deformed state) thereof.

Although each of the pair of Y-axis direction leaf springs 34 and 35 is resiliently deformed in the shape of a letter S as shown in FIG. 9, the pair of Y-axis direction leaf springs 34 and 35 can be resiliently deformed in the shape of a barrel or a bobbin. Similarly, the pair of X-axis direction leaf springs 30 and 31 can be resiliently deformed in the shape of a barrel or a bobbin.

Figure 8:
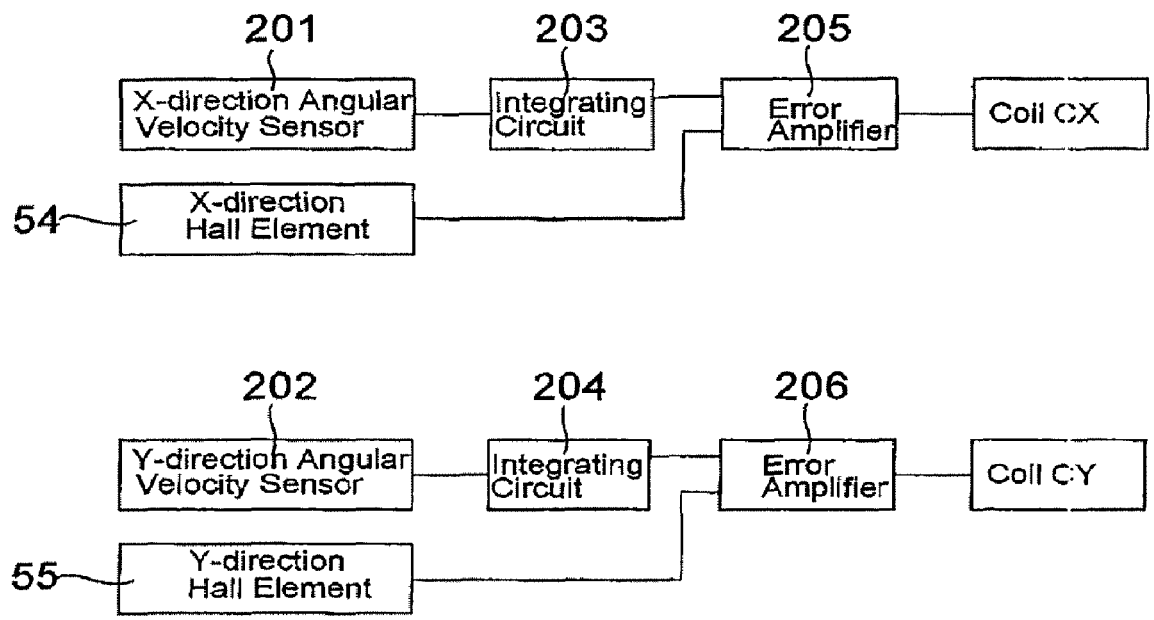
FIG. 8 is a block diagram of an embodiment of a control circuit for the camera shake correction apparatus.

Although the connecting member 36 moves in the X-axis direction not exactly linearly but substantially linearly with a slight displacement in the Y-axis direction when the error amplifier 205 supplies an electric current only to the X-axis direction planar drive coil CX as described above, image shake is properly corrected in practice because such a displacement in the Y-axis direction is detected by a control circuit shown in FIG. 8 using the Y-axis direction Hall element 55 so that the Y-axis direction planar drive coil CY is also supplied with an electric current to offset such a displacement in the Y-axis direction.

Similar to the case when the error amplifier 205 supplies an electric current only to the X-axis direction planar drive coil CX, if the error amplifier 206 supplies an electric current only to the Y-axis direction planar drive coil CY in a specific direction, an upward linear force in the Y-axis direction is produced in the Y-axis direction planar drive coil CY due to the magnetic force produced by the Y-axis direction magnetic circuit provided between the X-axis direction plate portion 66 and a combination of the X-axis direction plate portion 61 and the permanent magnet 63. Thereupon, each of the pair of X-axis direction leaf springs 30 and 31 is resiliently deformed in the shape of a letter S as viewed along the Z-axis direction so that the movable support side-member 32 substantially linearly moves upward in the Y-axis direction relative to the stationary support side-member 29 within a range of movement in which the movable support side-member 32 does not come in contact with the camera body, and accordingly, the coil substrate 50 and the image pickup device 11 substantially linearly move upward on the other hand, if the error amplifier 206 supplies an electric current only to the Y-axis direction planar drive coil CY in the direction opposite to the aforementioned specific direction, a downward linear force in the Y-axis direction is produced in the Y-axis direction planar drive coil CY due to the magnetic force produced by the Y-axis direction magnetic circuit. Thereupon, each of the pair of X-axis direction leaf springs 30 and 31 is resiliently deformed in the shape of a letter S as viewed along the Z-axis direction so that the movable support side-member 32 substantially linearly moves downward in the Y-axis direction relative to the stationary support side-member 29 within a range of movement in which the movable support side-member 32 does not come in contact with the camera body, and accordingly, the coil substrate 50 and the image pickup device 11 substantially linearly move downward.

Although the connecting member 36 moves in the Y-axis direction not exactly linearly but substantially linearly with a slight displacement in the X-axis direction when the error amplifier 206 supplies an electric current only to the Y-axis direction planar drive coil CY as described above, image shake is properly corrected in practice because such a displacement in the X-axis direction is detected by the control circuit shown in FIG. 8 using the X-axis direction Hall element 54 so that the X-axis direction planar drive coil CX is also supplied with an electric current to offset such a displacement in the X-axis direction.

Accordingly, image shake caused by hand shake is corrected by variations in position of the image pickup device 11 in the X-Y axis directions in accordance with movements of the coil substrate 50 in the X-Y axis directions. Although the shake correction operation (image stabilizing operation) in the X-axis direction and the shake correction operation (image stabilizing operation) in the Y-axis direction have been discussed above independently of each other in the above description, these two shake correction operations are concurrently performed under normal conditions, and accordingly, the effects of any deflections of the digital camera 10 in all directions (at any angle from 0 to 360 degrees) in an X-Y axis plane can be counteracted.

In the above described embodiment, in order to allow the image pickup device 11 to move parallel to itself in an X-Y axis plane that is orthogonal to the optical axis O, the pair of X-axis direction leaf springs 30 and 31 and the pair of Y-axis direction leaf springs 34 and 35 hold the image pickup device 11 to allow the image pickup device 11 to move both in the direction of resilient stress of the pair of X-axis direction leaf springs 30 and 31 in the Y-axis direction and in the direction of resilient stress of the pair of Y-axis direction leaf springs 34 and 35 in the X-axis direction. Therefore, the image pickup device 11 has a natural frequency (natural vibration frequency in the Y-axis direction and the X-axis direction) determined by the mass of a movable portion 100 which includes the stage apparatus 20 excluding the 21, 22 and 29, the image pickup device 11 (the optical low-pass filter 45, 50, the X-axis direction planar drive coil CX, and the Y-axis direction planar drive coil CYY), the resiliency of the pair of X-axis direction leaf springs 30 and 31, the resiliency of the pair of Y-axis direction leaf springs 34 and 35, and the elasticity of the aforementioned electric supply lines and signal lines.

The spring constant when the movable portion 100 is moved in the X-Y axis directions is herein referred to as "$K_0$". If the mass of the movable portion 100 is herein referred to as "M", the natural frequency of the movable portion 100 is represented by the following expression:

$(K_0/M)^{1/2}/2\pi$.

Moreover, as well known in the art, a transfer function which represents the relationship between the driving force for driving the movable portion 100 and the displacement of the movable portion 100 when the movable portion 100 having the mass M is driven (moved) by a resilient member having the spring constant $K_0$ in the horizontal direction is represented by the following expression:

$1/(M_s^2+K_0)$.

Figure 10:
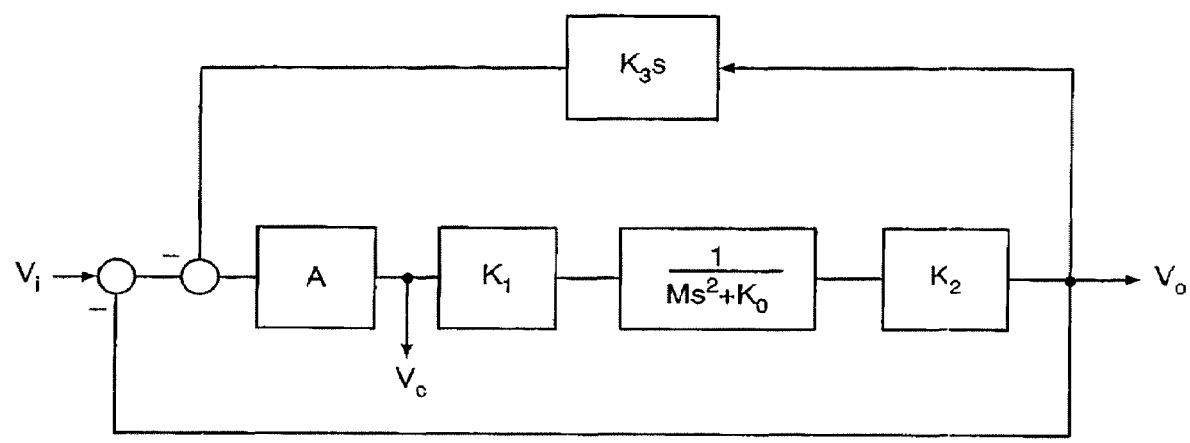
FIG. 10 is a block diagram of an embodiment of a speed control circuit which controls the speed of a movable portion of the camera shake correction apparatus in the X-axis direction based on a transfer function $(1/(M_s^2 + K_O)$.

FIG. 10 is a block diagram of an embodiment of a speed control circuit which controls the speed of the movable portion 100 in the X-axis direction based on this transfer function. Since the actual camera shake correction apparatus is driven two-dimensionally, two pairs of speed control circuits (four speed control circuits in total) are required in practice. In FIG. 10, "$V_i$" represents the integral (integral value) obtained by integrating the output of the X-axis direction angular velocity sensor 201 by the integrating circuit 203. This integral is input to the speed control circuit as a camera shake detection signal (shake detection signal) having a camera shake detection signal voltage $V_i$.

The difference between the camera shake detection signal voltage $V_i$ and a Hall sensor output voltage $V_0$, which corresponds to the output of a Hall sensor (the X-axis direction Hall element 54) for detecting displacements of the movable portion 100, is amplified by an error amplifier (A) to be output as a drive-coil applied voltage $V_c$. The drive-coil applied voltage $V_c$ is applied to a drive coil (the X-axis direction planar drive coil CX). This application of the drive-coil applied voltage $V_c$ causes this drive coil to produce a driving force which drives the movable portion 100, while displacements of the movable portion 100 are converted into the Hall sensor output voltage $V_0$ at the Hall sensor (the X-axis direction Hall element 54). Namely, the drive-coil applied voltage $V_c$ is converted into a driving force by a coil voltage-to-force conversion coefficient ($K_1$), this driving force is converted into a driving amount by a transfer function ($1/(M_s^2+K_0)$), and this driving amount is converted into the Hall sensor output voltage $V_0$ by a displacement sensor displacement-to-voltage conversion coefficient ($K_2$).

A differentiating circuit ($K_3s$) differentiates the Hall sensor output voltage $V_0$ to be converted into a voltage which is proportional to the displacement speed of the movable portion 100, and subtracts this voltage from the difference between the camera shake detection signal voltage $V_i$ and the Hall sensor output voltage $V_0$ for detecting displacements of the movable portion 100. In practice, this difference in voltage (voltage difference) thus obtained via the differentiating circuit ($K_3s$) becomes input to the error amplifier (A). The differentiating circuit ($K_3s$) operates so that the displacement speed of the movable portion does not become excessively high and is therefore useful for stabilizing the operation of the movable portion.

Due to the above described control by the speed control circuit, the movable portion 100 is driven in directions to reduce the voltage difference at a speed corresponding to the speed of camera shake to thereby reduce (compensate for) image shake caused by hand shake.

The transfer function $G_0$ and the transfer function $G_c$ can be set via the speed control circuit shown in FIG. 10. The transfer functions $G_0$, and $G_c$ are represented by the following two equations (EQUATION 1 and EQUATION 2), respectively. The transfer function $G_o$ that is represented by EQUATION 1 shows the operating characteristic of the anti-shake system (camera shake correction apparatus), i.e., the ratio between the displacement amplitude (Hall sensor output voltage) $V_0$ and the camera shake detection signal voltage $V_i$. The transfer function $G_c$ that is represented by EQUATION 2 shows the ratio between the drive-coil applied voltage $V_c$ and the camera shake detection signal voltage $V_i$.

$$G_o = \frac{V_o}{V_i} = \frac{AK_1K_2}{Ms^2 + AK_1K_2K_3s + K_0 + AK_1K_2} \quad \text{[EQUATION 1]}$$

$$G_c = \frac{V_c}{V_i} = \frac{A(Ms^2 + K_0)}{Ms^2 + AK_1K_2K_3s + K_0 + AK_1K_2} \quad \text{[EQUATION 2]}$$

wherein "$V_c$" represents the drive-coil applied voltage,

"A" represents the error amplification factor,

"M" represents the mass of the movable portion,

"$K_1$" represents the coil voltage-to-force conversion coefficient,

"$K_2$" represents the displacement sensor displacement-to-voltage conversion coefficient, "$K_3$" represents the time constant of the differentiating circuit, and "$K_0$" represents the spring constant.

Figure 11:
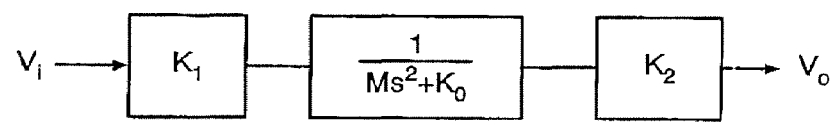
FIG. 11 is a block diagram of an embodiment of a speed control circuit which controls the speed of the movable portion of the camera shake correction apparatus in the X-axis direction based on the transfer function $(1/(M_s^2 + K_O)$ with no feedback control.

FIG. 11 is a block diagram of another embodiment of the speed control circuit which controls the speed of the movable portion 100 in the X-axis direction based on the aforementioned transfer function ($1/(M_s^2+K_0)$ with no feedback control. The transfer function $F_0$ that is represented by EQUATION 3 shown below shows the ratio between the displacement amplitude (Hall sensor output voltage) $V_0$ and the input signal (camera shake detection signal voltage) $V_i$.

$$F_0 = \frac{V_o}{V_i} = \frac{K_1K_2}{Ms^2 + K_0} \quad \text{[EQUATION 3]}$$

Control characteristics of the control circuit which are given by the EQUATIONS 1 and 2 will be hereinafter discussed with reference to FIGS. 12 through 18.

FIGS. 12, 13A, 13D and 14 show Bode plots of the amplitude characteristics of the transfer functions $F_0$, $G_0$, $G_0$ and $G_c$, respectively, when the spring constant is adjusted by adjusting, e.g., the thickness of each of the pair of X-axis direction leaf springs 30 and 31 to set the natural frequency of the movable portion 100 in the vicinity of 30 Hz, which is higher than 15 Hz: the upper limit of frequency of camera shake.

Figure 12:
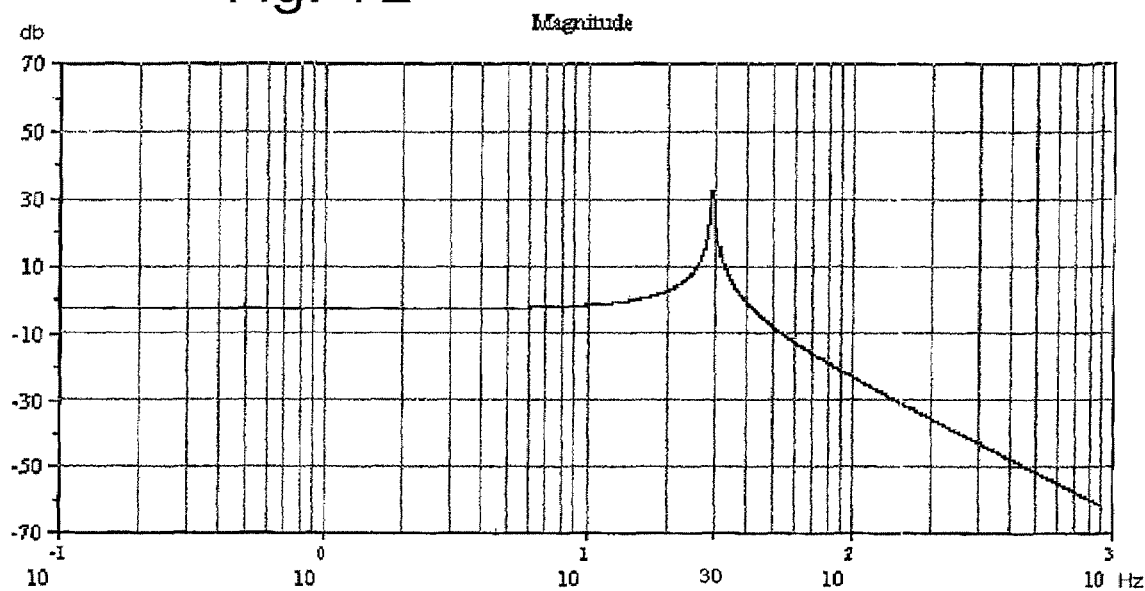
FIG. 12 is a Bode plot of the amplitude characteristic of a transfer function $F_0$ in the camera shake correction apparatus in the case where the natural frequency is set in the vicinity of 30 Hz.

FIG. 12 is a Bode plot of the amplitude characteristic of the transfer function $F_0$. In this Bode plot, the vertical axis and the horizontal axis represent the displacement amplitude (db) and the input frequency (Hz), respectively. In this case, it can be seen that the displacement amplitude is maintained constant up to the frequency of an input signal in the order of 10 Hz; however, the displacement amplitude drastically increases in the vicinity of the natural frequency of 30 Hz because of an occurrence of resonance and subsequently decreases at high frequencies.

Figure 13A:
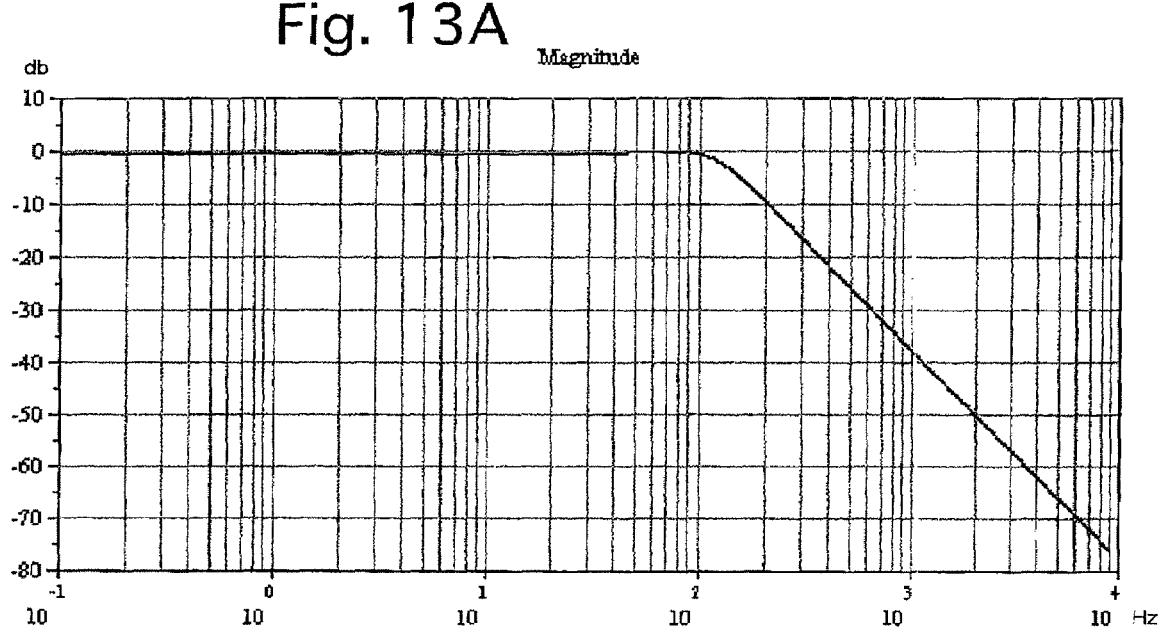
FIG. 13A is a Bode plot of the amplitude characteristic "$|V_0/V_i|$" of a transfer function $G_0$ in the camera shake correction apparatus in the case where the natural frequency is set in the vicinity of 30 Hz.
Figure 13B:
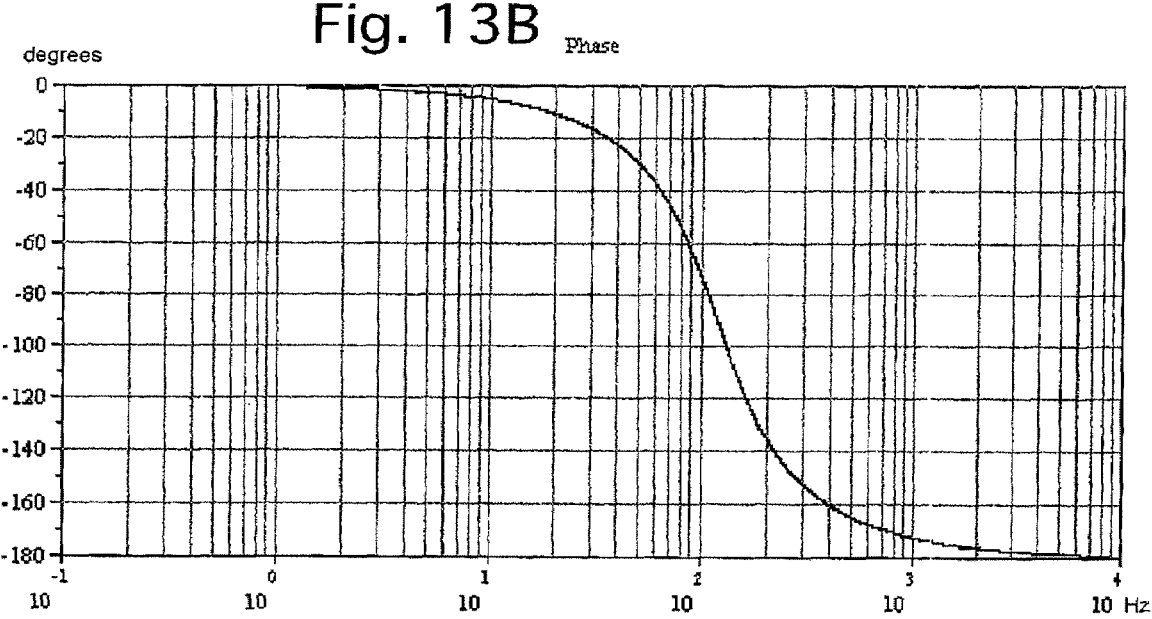
FIG. 13B is a Bode plot of the phase characteristic of the transfer function $G_0$ in the camera shake correction apparatus in the case where the natural frequency is set in the vicinity of 30 Hz.

FIG. 13A is a Bode plot of the amplitude characteristic "$|V_0/V_i|$" of the transfer function $G_0$, and FIG. 13B is a Bode plot of the phase characteristic of the transfer function $G_0$. In the Bode plot shown in FIG. 13A, the vertical axis and the horizontal axis represent the displacement amplitude (db) and the input frequency (HZ), respectively. In the Bode plot shown in FIG. 13B, the vertical axis and the horizontal axis represent the phase delay (°) and the input frequency (Hz), respectively. The amplitude characteristic has been adjusted to a coefficient $K_3$ so that the displacement amplitude is maintained at 0 (zero) db as long as possible until reaching a high frequency. As can be clearly seen from these Bode plots, at the upper limit of frequency (15 Hz) of camera shake, the amplitude characteristic is maintained at 0 db and the phase delay remains within the degree of 10°.

FIG. 14 is a Bode plot of the amplitude characteristic of the transfer function $G_c$. This Bode plot shows that the frequency of an input signal drops and the drive-coil applied voltage becomes extremely low in the vicinity of the natural frequency of 30 Hz.

Figure 18A:
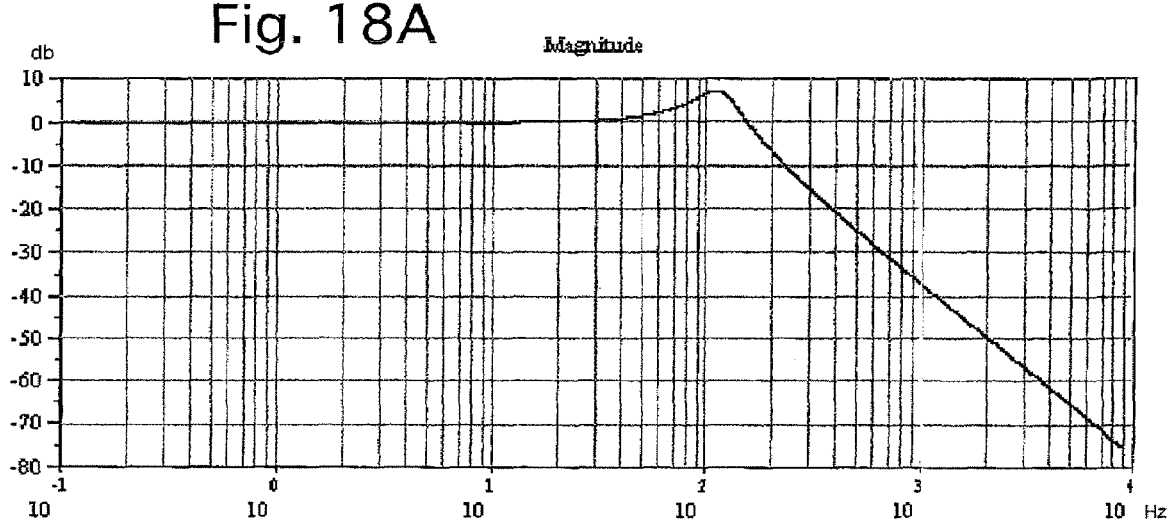
FIG. 18A is a Bode plot of the amplitude characteristic "$|V_0/V_i|$" of the transfer function $F_0$ in the camera shake correction apparatus in the case where the natural frequency is set in the vicinity of 30 Hz while a time constant $K_3$ of a differentiating circuit is set smaller than an optimum adjustment value.
Figure 18B:
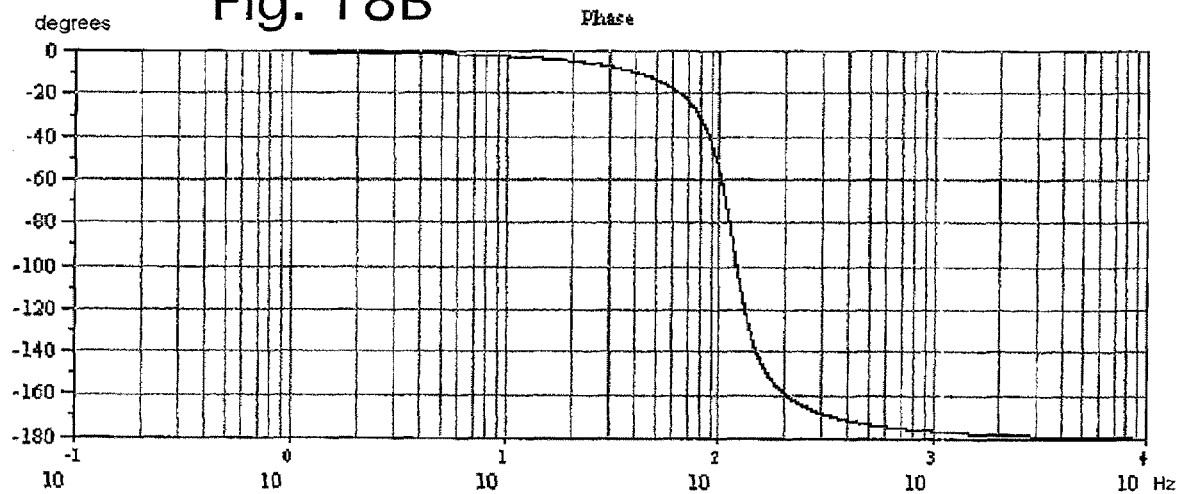
FIG. 18B is a Bode plot of the phase characteristic of the transfer function $F_0$ in the case where the natural frequency is set in the vicinity of 30 Hz while the time constant $K_3$ of the differentiating circuit is set smaller than the optimum adjustment value.

FIG. 18A is a Bode plot of the amplitude characteristic "$|V_0/V_i|$" of the transfer function $F_0$ in the case where the natural frequency is set in the vicinity of 30 Hz while the time constant $K_3$ of the differentiating circuit is set smaller than an optimum adjustment value, and FIG. 18B is a Bode plot of the phase characteristic of the transfer function $F_0$ in the case where the natural frequency is set in the vicinity of 30 Hz while the time constant $K_3$ of the differentiating circuit is set smaller than the optimum adjustment value. If the time constant $K_3$ of the differentiating circuit is set smaller than an optimum adjustment value, a peak occurs in amplitude at a resonance point of the control system (in the vicinity of the frequency of 100 Hz), so that the system tends to oscillate, which is not desirable.

FIGS. 15, 16A, 16B and 17 show Bode plots of the amplitude characteristics of the transfer functions $F_0$, $G_0$, $G_0$ and $G_c$, respectively, when the spring constant is adjusted by adjusting, e.,g., the thickness of each of the pair of X-axis direction leaf springs 30 and 31 to set the natural frequency of the movable portion 100 in the vicinity of 6 Hz.

Figure 15:
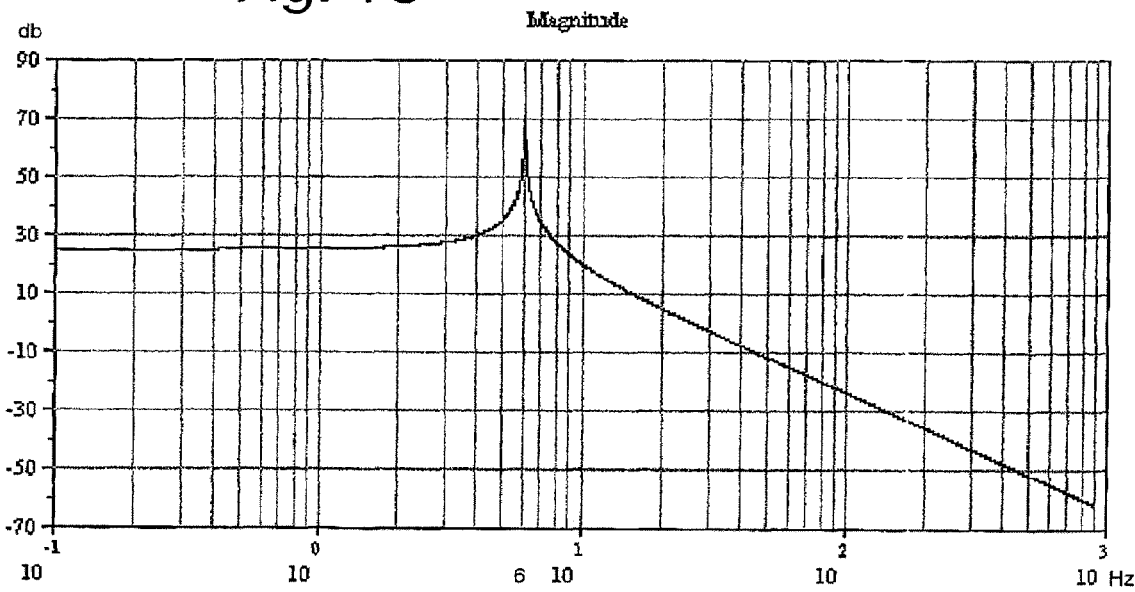
FIG. 15 is a Bode plot of the amplitude characteristic of the transfer function $F_0$ in the camera shake correction apparatus in the case where the natural frequency is set in the vicinity of 6 Hz.

FIG. 15 shows a Bode plot of the amplitude characteristic of the transfer functions $F_0$. In the Bode plot shown in FIG. 15, the vertical axis and the horizontal axis represent the displacement amplitude (db) and the input frequency (Hz), respectively. In this case, it can be seen that the displacement amplitude is maintained constant up to the frequency of an input signal in the order of 4 Hz; however, the displacement amplitude drastically increases in the vicinity of the natural frequency of 6 Hz because of an occurrence of resonance, and subsequently decreases at high frequencies.

Figure 16A:
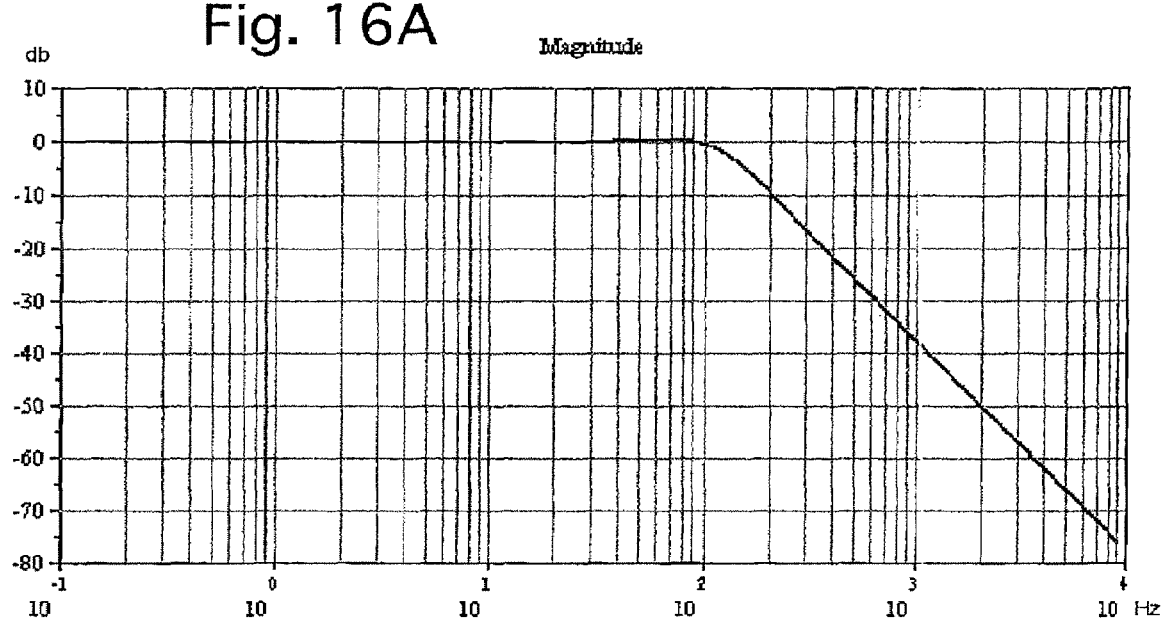
FIG. 16A is a Bode plot of the amplitude characteristic "$|V_0/V_i|$" of the transfer function $G_0$ in the camera shake correction apparatus in the case where the natural frequency is set in the vicinity of 6 Hz.
Figure 16B:
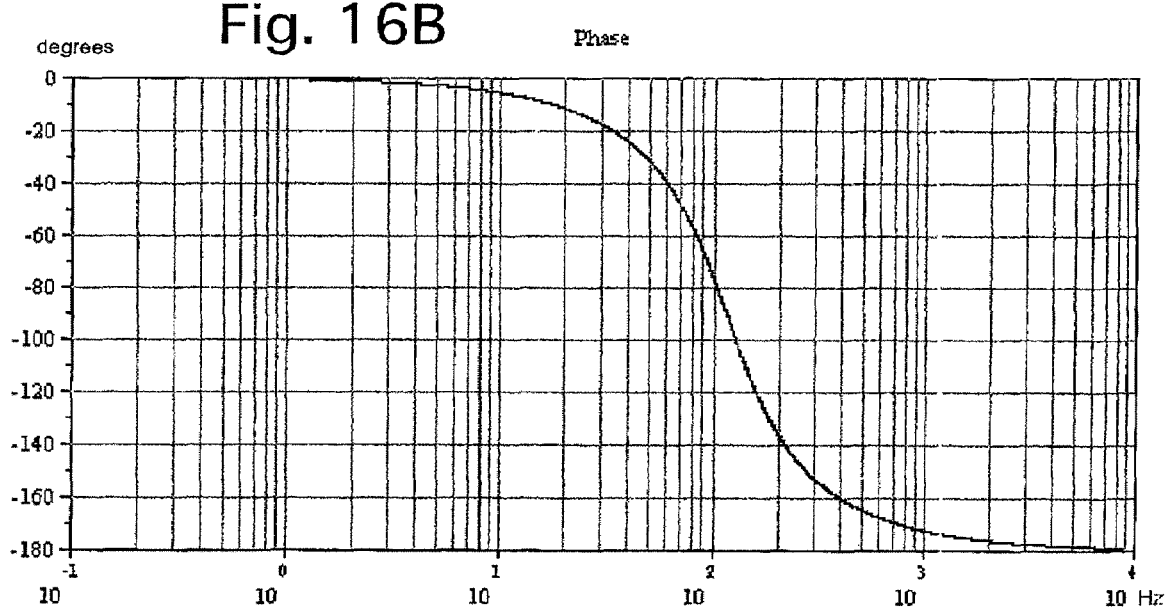
FIG. 16B is a Bode plot of the phase characteristic of the transfer function $G_0$ in the camera shake correction apparatus in the case where the natural frequency is set in the vicinity of 6 Hz.

FIG. 16A is a Bode plot of the amplitude characteristic "$|V_0/V_i|$" of the transfer function $G_0$, and FIG. 16B is a Bode plot of the phase characteristic of the transfer function $G_0$. In the Bode plot shown in FIG. 16A, the vertical axis and the horizontal axis represent the displacement amplitude (db) and the input frequency (Hz), respectively. In the Bode plot shown in FIG. 16B, the vertical axis and the horizontal axis represent the phase delay (°) and the input frequency (Hz), respectively. The amplitude characteristic has been adjusted to a coefficient $K_3$ so that the displacement amplitude is maintained at 0 (zero) db as long as possible until reaching a high frequency. As can be clearly seen from these Bode plots, at the upper limit of frequency (15 Hz) of camera shake, the amplitude characteristic is maintained at 0 db and the phase delay remains within the degree of 10°, similar to the embodiment shown in FIGS. 13A and 13B, and it can be understood that there is no conspicuous difference in performance characteristic between the embodiment shown in FIGS. 13A and 13B and the embodiment shown in FIGS. 16A and 16B. Namely, according to the embodiments to which the present invention is applied, no difference in performance characteristic occurs even if the natural frequency varies.

FIG. 17 is a Bode plot of the amplitude characteristic of the transfer function $G_c$. This Bode plot shows that the frequency of an input signal drops and the drive-coil applied voltage becomes extremely low in the vicinity of the natural frequency of 6 Hz.

From Bode plots of the amplitude characteristics shown in FIGS. 14 and 17, it can be understood that the drive-coil applied voltage can be extremely low when the input signal frequency is in the vicinity of the natural frequency. Namely, if the natural frequency is set within the range of frequencies of camera shake, the voltage applied to the drive coils to offset image shake caused by hand shake becomes small on average, which is effective for reducing power requirements.

When the embodiment (the natural frequency: 30 Hz) shown in FIG. 14 and the embodiment (the natural frequency: 6 Hz) shown in FIG. 17 are compared with each other, it can be seen that the amplitude characteristics in the embodiments shown in FIGS. 14 and 17 are approximately 2.5 db ($|V_0/V_i|$=1.3) and approximately −25 db ($|V_0/V_i|$=1.3), respectively, in the range of frequencies of camera shake far lower than the natural frequency. Namely, it can be understood that only one twenty-thirds (0.056/1.3=1/23) of the voltage required for the drive coils in the embodiment shown in FIG. 14 is necessary in the embodiment shown in FIG. 17 even if signals of camera shake having the same amplitude are input. This is because the magnetic force produced by the drive coils to drive the :movable portion against the resilient stress of the springs can be small (does not need to be great) because the spring constant $K_0$ decreases if the natural frequency is set at a low frequency, and accordingly, setting the natural frequency at a low frequency produces power savings, even over the entire range of frequencies of camera shake. Conversely, if the natural frequency is set at a high frequency, power consumption necessary for camera shake correction control increases.

Figure 19:
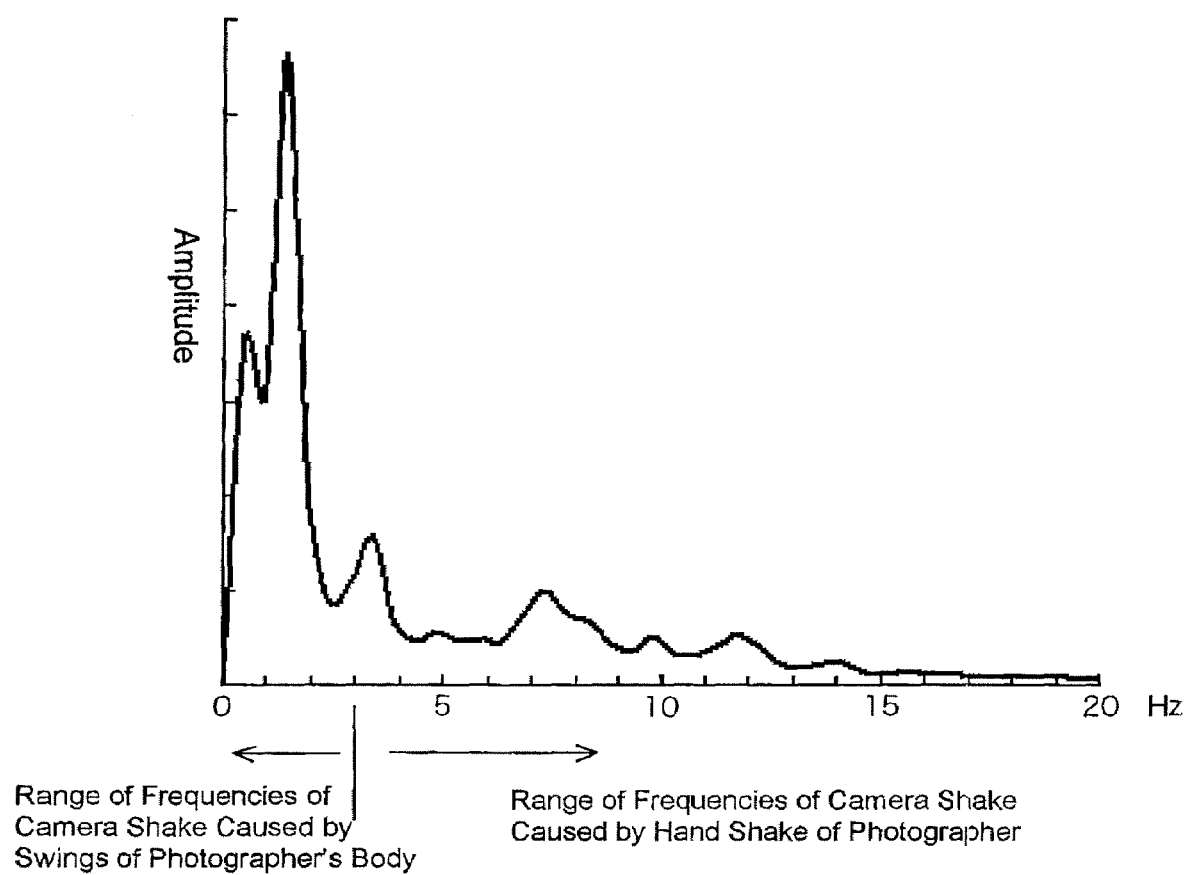
FIG. 19 is a graph showing the result of measurement of a frequency distribution of image shake on an imaging surface of a camera.

Additionally, if the natural frequency is set within the range of frequencies of camera shake which frequently occurs, a high degree of effectiveness of power savings is ensured. FIG. 19 shows the result of FFT (fast Fourier transform) measurement of a frequency distribution of image shake on an imaging surface of a camera. Among image shake on the imaging surface, deflections at and below 3 Hz are those caused by swings of a photographer's body and other deflections above 3 Hz are those caused by hand shake. Deflections caused by hand shake vary in individuals and also differ in the following factors: the posture of a photographer during picture taking, a manner of holding the camera body, the weight of the camera body, the shape of the camera body, and other factors. However, it can be seen from FIG. 19 that almost no hand shake having frequencies at and above 15 Hz exits, and that conspicuous frequencies of hand shake are found in the range of frequencies from approximately 3 to 9 Hz. Therefore, setting the natural frequency within the range of frequencies from 3 to 9 Hz is effective for reducing power requirements. Note that it is not desirable that the natural frequency be set at about 1.5 Hz that is within the range of frequencies of swings of a photographer's body because the spring constant of the resilient member for holding the movable portion is so small that the position of the image pickup device in the optical axis direction becomes unstable.

The anti-shake system according to the present invention is not limited solely to the stage apparatus 20 shown in FIGS. 1 through 7 and 9, but can also be applied to a drive mechanism which holds a correction lens or an image pickup device by a spring member (or spring members), and drives the correction lens or the image pickup device in directions of resilient stress of the spring member. For instance, the present invention can also be applied to a camera shake correction apparatus in which an image pickup device such as the image pickup device 11 is fixed and in which a correction lens (correction optical system) positioned in a photographing optical system is driven in directions orthogonal to an optical axis Of the photographing optical system to offset image shake caused by hand shake.

Figure 20:
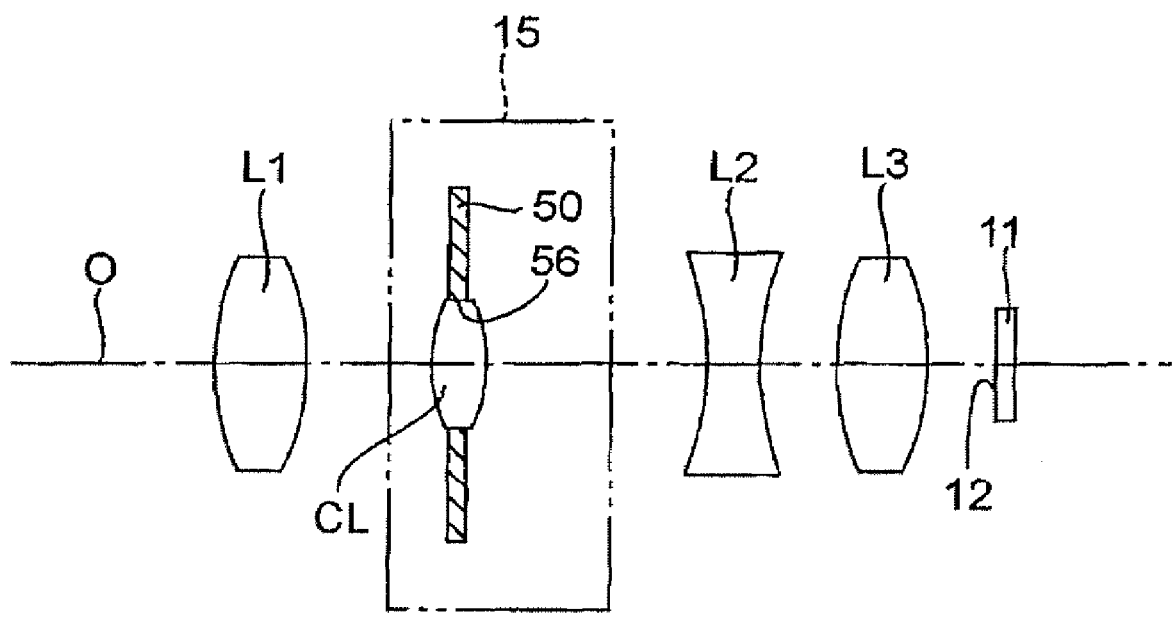
FIG. 20 is a schematic side view of a modified embodiment using a correction lens.

Although the image pickup device 11 is secured to the coil substrate 50 in the illustrated embodiment, it is possible to provide image pickup device 11 so as to be secured to the camera body, and for a circular mounting hole 56 to be formed in the coil substrate 50, so that the correction lens CL which is circular in a front elevation is fitted and secured in the circular mounting hole 56, and is located between the lens L1 and the lens L2 (or between the lens L2 and the lens L3), as shown in FIG. 20. In this arrangement, the image movement (image rotation) can be corrected by moving the correction lens CL in a reference plane thereof. Furthermore, the image movement correcting apparatus using the correction lens CL can be applied to a silver-halide film camera, without providing the image pickup device 11.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An anti-shake system comprising:
    a movable portion to which an optical element is mounted;
    a support member which holds said movable portion in a manner to allow said movable portion to move freely in directions orthogonal to an optical axis; and
    a drive system which drives said movable portion in said directions orthogonal to said optical axis,
    wherein a natural frequency of said movable portion that originates from said movable portion and said support member is set within the range of frequencies of shaking of an apparatus equipped with said anti-shake system which is caused by hand shake.

2. The anti-shake system according to claim 1, further comprising a closed-loop control system for driving said drive system based on a shake detection signal.

3. The anti-shake system according to claim 1, wherein said support member comprises at least one resilient member which holds said movable portion in said manner to allow said movable portion to move freely in said directions orthogonal to said optical axis, and
    wherein said drive system drives said movable portion in a direction of resilient stress of said resilient member.

4. The anti-shake system according to claim 1, wherein said support member comprises at least one resilient member which holds said movable portion at an initial position while allowing said movable portion to move freely in said directions orthogonal to said optical axis,
    wherein said optical element includes an image pickup device;
    wherein at least one of an elastically deformable signal line and an elastically deformable electric supply line is connected to said image pickup device from outside of said movable portion, and
    wherein said natural frequency of said movable portion originates from said movable portion, said support member and said one of said elastically deformable signal line and said elastically deformable electric supply line.

5. The anti-shake system according to claim 1, wherein said natural frequency of said movable portion is set by adjusting a spring constant of said resilient member.

6. The anti-shake system according to claim 1, wherein said natural frequency of said movable portion is set to below 15 Hz.

7. The anti-shake system according to claim 1, wherein said natural frequency of said movable portion is set within a range of frequencies from 3 to 9 Hz.

8. The anti-shake system according to claim 1, wherein said support member comprises:
    a pair of X-axis direction leaf springs and a pair of Y-axis direction leaf springs which extend in a specific X-axis direction and a Y-axis direction orthogonal to said X-axis direction in a free state, respectively.

9. The anti-shake system according to claim 1, wherein said drive system comprises:
    an X-axis direction planar drive coil and a Y-axis direction planar drive coil which are mounted to a coil substrate to be respectively positioned in magnetic fields of two stationary magnets.

10. The anti-shake system according to claim 1, wherein said apparatus that is equipped with said anti-shake system comprises a camera.

11. The anti-shake system according to claim 9, wherein said optical element is mounted on said coil substrate, and
    wherein said optical element comprises one of a correction optical system and an image pickup device.

12. An anti-shake system of a camera, comprising:
    a movable portion which supports an optical element of a photographing optical system of said camera, said movable portion being supported to be freely movable in directions orthogonal to an optical axis of said photographing optical system; and
    a drive system which drives said movable portion in said directions orthogonal to said optical axis to counteract effects of camera shake that is caused by hand shake,
    wherein a natural frequency of said movable portion is set within a range of frequencies of said camera shake.

13. The anti-shake system of a camera according to claim 12, wherein said optical element comprises one of an image pickup device and a lens element.

* * * * *